April 29, 1958 L. C. BROWN 2,832,168
METHOD AND APPARATUS FOR LURING AND CATCHING FISH
Filed Feb. 10, 1956 2 Sheets-Sheet 1

L. C. BROWN
INVENTOR.

BY Ralph B. Stewart
attorney

April 29, 1958 L. C. BROWN 2,832,168
METHOD AND APPARATUS FOR LURING AND CATCHING FISH
Filed Feb. 10, 1956 2 Sheets-Sheet 2
FIG. 4
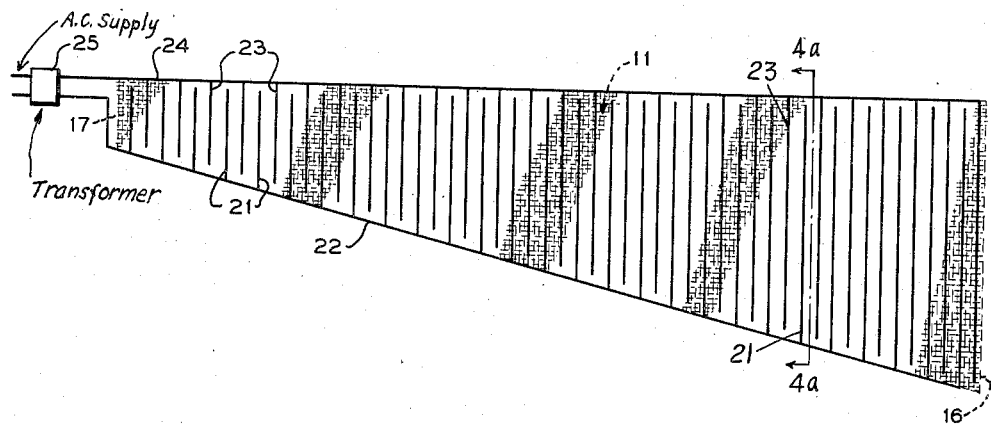
FIG. 5
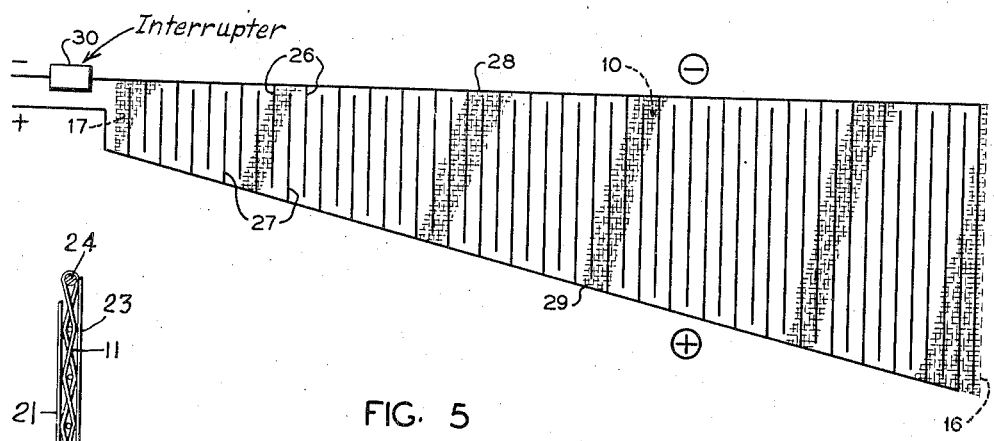
FIG. 4a
L. C. BROWN
INVENTOR.
BY Ralph B. Stewart
Attorney

United States Patent Office 2,832,168
Patented Apr. 29, 1958

2,832,168

METHOD AND APPARATUS FOR LURING AND CATCHING FISH

Leslie C. Brown, Bellingham, Wash., assignor of one-half to Joseph T. Pemberton, Bellingham, Wash.

Application February 10, 1956, Serial No. 564,700

3 Claims. (Cl. 43—17.1)

This invention relates to method and apparatus for luring and catching fish and more particularly to the employment and arrangement of electrical means most effectively adapted for commercially taking fish.

One object of this invention resides in the simultaneous utilization of different types of electrical currents, the cumulative effect of which will not only attract fish to within the confines of a specific region but will also cause the fish to remain in such region whereby they may be easily harvested.

Another object of this invention is to provide means whereby spaced areas within a body of water are subjected to different types of electric currents so as to lure and entrap fish within the region defined between such areas.

Another object of this invention is to provide means whereby spaced, generally opposed areas within a body of water are subjected to an alternating electric current and a cyclically interrupted direct current respectively, to lure and entrap fish within the region of water between such areas.

Still another object of this invention resides in the use of a V-shaped net system towed through a body of water in such a fashion that the apical portion of the net system is trailing, the two legs of the net system having electrically energized electrodes associated therewith so that the water in the area adjacent one side or leg of the net system is subjected to an alternating electric current while the water adjacent the other leg is subjected to a cyclically interrupted direct current, with fish-removing means being disposed to withdraw entrapped fish from within the apex of the net system.

Further, the invention proposes the construction of fishing apparatus incorporating a pair of elongated nets interconnected at one end and each having spaced electrodes throughout, with the free ends of the nets being adapted to be towed in widely spaced relation so that the net system assumes a V-shaped configuration, with means for removing entrapped fish at the apex and means for establishing an alternating electric current in the water between adjacent electrodes in one net while establishing a cyclically interrupted direct current in the water between the electrodes in the other net.

Still another object of the invention resides in apparatus in conformity with the foregoing object in which a horizontally arranged net interconnects the side nets at their apex and serves to form a bottom wall or closure for the region in which the entrapped fish are removed.

One suitable embodiment of my invention is illustrated in the accompanying drawing in which:

Figure 4 is an elevational diagrammatic view showing the disposition of the electrodes and the electrical connections thereto in one leg of the net system; and Figure 4a is a structural view of Figure 4, in section, taken along the line 4a—4a but on an enlarged scale; and Figure 5 is a view similar to Figure 4 but showing the electrical connections for the other leg of the net system.

Figure 1:
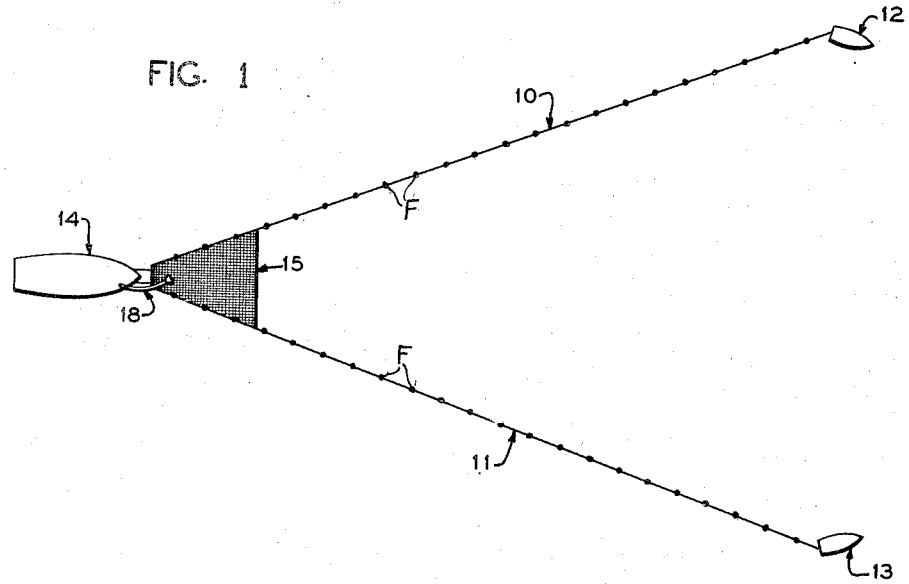
Figure 1 is a plan view illustrating the construction and use of the invention.
Figure 2:
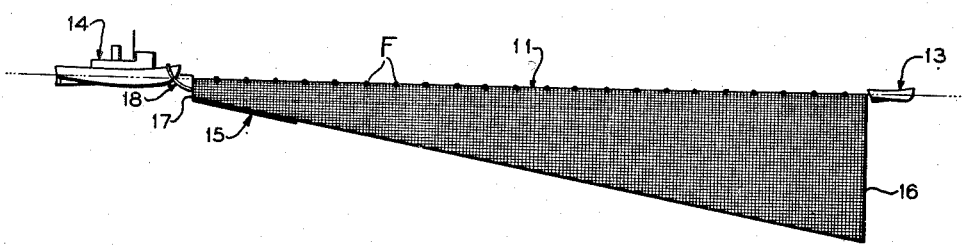
Figure 2 is a side elevation of the assembly shown in Figure 1.

Referring more particularly to Figures 1 and 2, wherein the general arrangement and construction of component parts is shown, reference characters 10 and 11 indicate the left-hand and right-hand nets or seines respectively, each of which is of generally triangular or trapezoidal form in a vertical plane. These two side nets are arranged to be towed or moved while in divergent, generally V-shaped relation such that the widely spaced free ends thereof are foremost. For this purpose, the two powered boats 12 and 13 are used, each being secured to its associated side net in any desired manner.

The trailing ends of the side nets are interconnected by virtue of joint securement to the trailing craft 14, and also by means of the bottom net 15 which is stretched between and firmly anchored to the side nets at the lower edges thereof, as is best illustrated in Figure 2. Thus, the side nets operate in the manner of a funnel or scoop due to their V-shaped relation and the movement imparted thereto by the towing boats 12 and 13.

Figure 3:
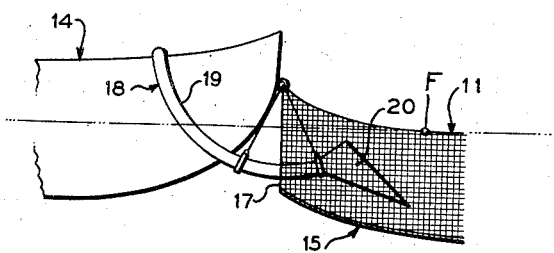
Figure 3 is an enlarged elevational view showing the fish-removing means.

For commercial fishing purposes, each net 10 and 11 may be of a length of approximately 600 feet with the vertical leading edge 16 extending to a depth of about 35 feet, each net being provided with the usual floats F spaced along its upper edge. The trailing vertical edge 17 of each net may extend to a depth of about 6 feet. The bottom net 15 may extend forward of the apex for a distance of about 30 feet, sufficient to provide a closure or floor in the shallowest region of the net assembly to assure that the fish will be funneled into the apex for removal by the suction apparatus designated generally by the reference character 18 in Figure 3.

The suction apparatus embodies a length of flexible hose 19 of appropriate diameter, usually 12 inches, and, as shown, one end thereof is submerged at the apex of the side nets and is provided with a bell-like entrance or intake scoop 20. The other end of the hose is connected to any suitable suction means to draw the fish into the hose for eventual disposition into the trailing craft 14.

As shown most clearly in Figures 4 and 4a one side net, for example the net 11, is provided throughout with a series of generally vertical, spaced parallel electrodes 21, which are secured to the net and extend upwardly from the common conductor 22 which in turn extends along and is secured to the lower edge of the net. Disposed between adjacent electrodes 21 are the electrodes 23 extending downwardly from common conductor 24 fixed along the upper edge of the net.

It is preferred to form the electrodes of lengths of bare conductor of a material which does not corrode easily. For example, I find a No. 10 stranded wire to be satisfactory, and it may be plated with a non-corrosive metal. The electrodes in each set may be spaced about 6 feet apart which will provide a 3-foot spacing between adjacent electrodes.

The two conductors 22 and 24 lead to a transformer 25 located on board the craft 14, the transformer being connected to a suitable source of alternating current. Preferably, the transformer output is of the order of 48 volts. With the arrangement of electrodes above described, it will be apparent that an alternating electric current will flow through the water between electrodes 21 and 23 throughout the area adjacent the net 11.

The other net 10, as shown in Figure 5, is provided with a similar arrangement of electrodes 26 and 27 connected respectively to the common conductors 28 and 29 fixed along the upper and lower edges respectively of the net. The two conductors 28 and 29 are connected to a suitable source of direct current, preferably 48 volts, located on the craft 14. In one of the conductors, conductor 28 in the drawings, an interrupter is provided to periodically interrupt the current to electrodes 26. The interrupter may take any desired form although it is preferred that the direct current be interrupted at a rate of about 120 times per minute.

It will be understood that nets 10 and 11 are formed of non-conducting material. While it is preferred that the electrodes and supply conductors 22—24 and 28—29 be bare, a thin coating of insulation may be provided if desired. Also, it will be understood that the supply conductors act as electrodes to a certain extent since a certain amount of current will flow directly between the two supply conductors of each net.

In use, the apparatus is towed as described above while the alternating and cyclically interrupted direct currents are simultaneously applied to the electrodes of the respective side nets. The cumulative effect of the two different currents not only attracts fish but also effects the fish so as to cause them to swim around in circles between the nets, rendering their capture an easy matter, as the nets are moved along to sweep the fish into the apex.

I claim:

1. Apparatus for catching fish comprising, a pair of elongated nets, interconnecting means connecting said elongated nets and being constructed and arranged to retain fish therein, said elongated nets extending in divergent relation therefrom, means connected to the other ends of the nets for towing the same, each net having floats secured at spaced points along one edge thereof to suspend the net in a vertical plane within the water, a first set of electrodes secured to each net in spaced parallel relation and extending from the top edge of said net vertically across substantially the entire width of the net, a second set of electrodes carried by each net in spaced parallel relation with the first set and being interleaved with the electrodes of said first set, the electrodes of the second set extending from the lower edge of said net substantially entirely across the width of the net but being insulated from the electrodes of the first set, a first supply conductor extending along the upper edge of said net and being connected to the upper ends of the electrodes in the first set, a second supply conductor extending along the lower edge of each net and being connected to the lower end of the electrodes of the second set, and means for applying a periodically varying voltage between the two supply conductors of each net.

2. Apparatus according to claim 1 wherein a source of alternating current voltage is connected between the supply conductors of one net, and a source of cyclically interrupted direct current is connected between the supply conductors of the other net.

3. Apparatus according to claim 1, wherein the vertical width of each net gradually increases from its connected end to its free end, and the bottom edges of the two nets at their connected ends are connected together by said interconnecting means, extending net to form a pocket for the entrapment of fish at the apex of the net arrangement.

References Cited in the file of this patent

UNITED STATES PATENTS

| | | |
|---|---|---|
| 1,974,444 | Burkey | Sept. 25, 1934 |
| 2,233,045 | Bonner et al. | Feb. 25, 1941 |
| 2,238,897 | Gomez | Apr. 22, 1941 |
| 2,426,037 | Mahoney et al. | Aug. 19, 1947 |
| 2,745,205 | Kafka | May 15, 1956 |
| 2,778,140 | Applegate et al. | Jan. 22, 1957 |
| 2,808,674 | Vang | Oct. 8, 1957 |

FOREIGN PATENTS

| | | |
|---|---|---|
| 699,346 | Great Britain | Nov. 4, 1953 |

UNITED STATES PATENT OFFICE
CERTIFICATE OF CORRECTION

Patent No. 2,832,168                                                        April 29, 1958

Leslie C. Brown

It is hereby certified that error appears in the printed specification of the above numbered patent requiring correction and that the said Letters Patent should read as corrected below.

Column 4, line 23, for "extending net to form" read — said interconnecting means being a horizontally extending net defining —.

Signed and sealed this 5th day of August 1958.

(SEAL)
Attest:

KARL H. AXLINE                                                 ROBERT C. WATSON
Attesting Officer                                             Commissioner of Patents